United States Patent
Ajami et al.

(10) Patent No.: US 11,956,823 B2
(45) Date of Patent: Apr. 9, 2024

(54) COMMUNICATION PARAMETER SIGNALING FOR PEER-TO-PEER COMMUNICATIONS

(71) Applicant: QUALCOMM Incorporated, San Diego, CA (US)

(72) Inventors: Abdel Karim Ajami, San Diego, CA (US); Yanjun Sun, San Diego, CA (US); George Cherian, San Diego, CA (US); Sai Yiu Duncan Ho, San Diego, CA (US); Alfred Asterjadhi, San Diego, CA (US); Abhishek Pramod Patil, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/525,708

(22) Filed: Nov. 12, 2021

(65) Prior Publication Data

US 2023/0156793 A1    May 18, 2023

(51) Int. Cl.
*H04W 74/08* (2009.01)
*H04W 48/16* (2009.01)
(Continued)

(52) U.S. Cl.
CPC ....... *H04W 74/0816* (2013.01); *H04W 48/16* (2013.01); *H04W 48/20* (2013.01); *H04W 72/0446* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2021/0076413 A1* | 3/2021 | Lu | H04W 74/002 |
| 2022/0174691 A1* | 6/2022 | Xia | H04W 74/0816 |
| 2023/0094276 A1* | 3/2023 | Huang | H04L 5/001 370/329 |

FOREIGN PATENT DOCUMENTS

| | | |
|---|---|---|
| WO | 2018036409 A1 | 3/2018 |
| WO | 2021222374 A1 | 11/2021 |

OTHER PUBLICATIONS

Cherian G., (QUALCOMM) et al., "Coordinated AP Time and Frequency Sharing in a Transmit Opportunity in 11be", IEEE Draft, 11-19-1582-02-00BE-Coordinated-AP-Time-and-Frequency-Sharing-In-A-Transmit-Opportunity-in-11be, IEEE-SA Mentor, Piscataway, NJ, USA, vol. 802.11 EHT, 802.11be, No. 2, Jan. 14, 2020 (Jan. 14, 2020), pp. 1-15, XP068165239, pp. 3-10.
(Continued)

*Primary Examiner* — Hong S Cho
(74) *Attorney, Agent, or Firm* — Patterson & Sheridan LLP

(57) ABSTRACT

Aspects of the present disclosure relate to wireless communications, and more particularly, to techniques for signaling parameters for peer-to-peer communications in a wireless network. One aspect provides a method for wireless communications at an access point (AP). The method generally includes: obtaining, from an access point (AP), a transmission opportunity (TXOP) sharing trigger indicating a duration in which a TXOP is shared by the wireless station and one or more other devices; relaying, to the one or more other devices, information identifying parameters for wireless communications between the wireless station and the one or more other devices; and during the TXOP, communicating with the one or more other devices based on the parameters for wireless communications between the wireless station and the one or more other devices.

41 Claims, 10 Drawing Sheets

(51) Int. Cl.
    *H04W 48/20*     (2009.01)
    *H04W 72/0446*     (2023.01)
    *H04W 72/21*     (2023.01)
    *H04W 74/0816*     (2024.01)

(56) References Cited

OTHER PUBLICATIONS

International Search Report and Written Opinion—PCT/US2022/077095—ISA/EPO—dated Dec. 5, 2022.

* cited by examiner

COMMUNICATION PARAMETER SIGNALING FOR PEER-TO-PEER COMMUNICATIONS

Aspects of the present disclosure relate to wireless communications, and more particularly, to techniques for communicating parameters for wireless communications for peer-to-peer communications in wireless networks.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

Aspects of the present disclosure relate to wireless communications, and more particularly, to techniques for signaling parameters for wireless communications to wireless communication devices.

One aspect provides a method for wireless communications at a wireless station. The method generally includes: obtaining, from an access point (AP), a transmission opportunity (TXOP) sharing trigger indicating a duration in which a TXOP is shared by the wireless station and one or more other devices; relaying, to the one or more other devices, information identifying parameters for wireless communications between the wireless station and the one or more other devices; and during the TXOP, communicating with the one or more other devices based on the parameters for wireless communications between the wireless station and the one or more other devices.

One aspect provides a method for wireless communications at a wireless station. The method generally includes: establishing a connection with a second wireless station; obtaining from the second wireless station information identifying parameters for wireless communications between the wireless station and the second wireless station; and communicating with the second wireless station during a transmission opportunity (TXOP) based on the parameters for wireless communications between the wireless station and the second wireless station.

One aspect provides a method for wireless communications at an access point (AP). The method generally includes: outputting, for transmission to a wireless station, information identifying parameters for wireless communications between the wireless station and one or more other devices; outputting, for transmission to the wireless station, a transmission opportunity (TXOP) sharing trigger indicating a duration in which the TXOP is to be shared by the wireless station and one or more other devices; and communicating with the wireless station during at least part of the TXOP based on the parameters for wireless communications between the wireless station and one or more other devices.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
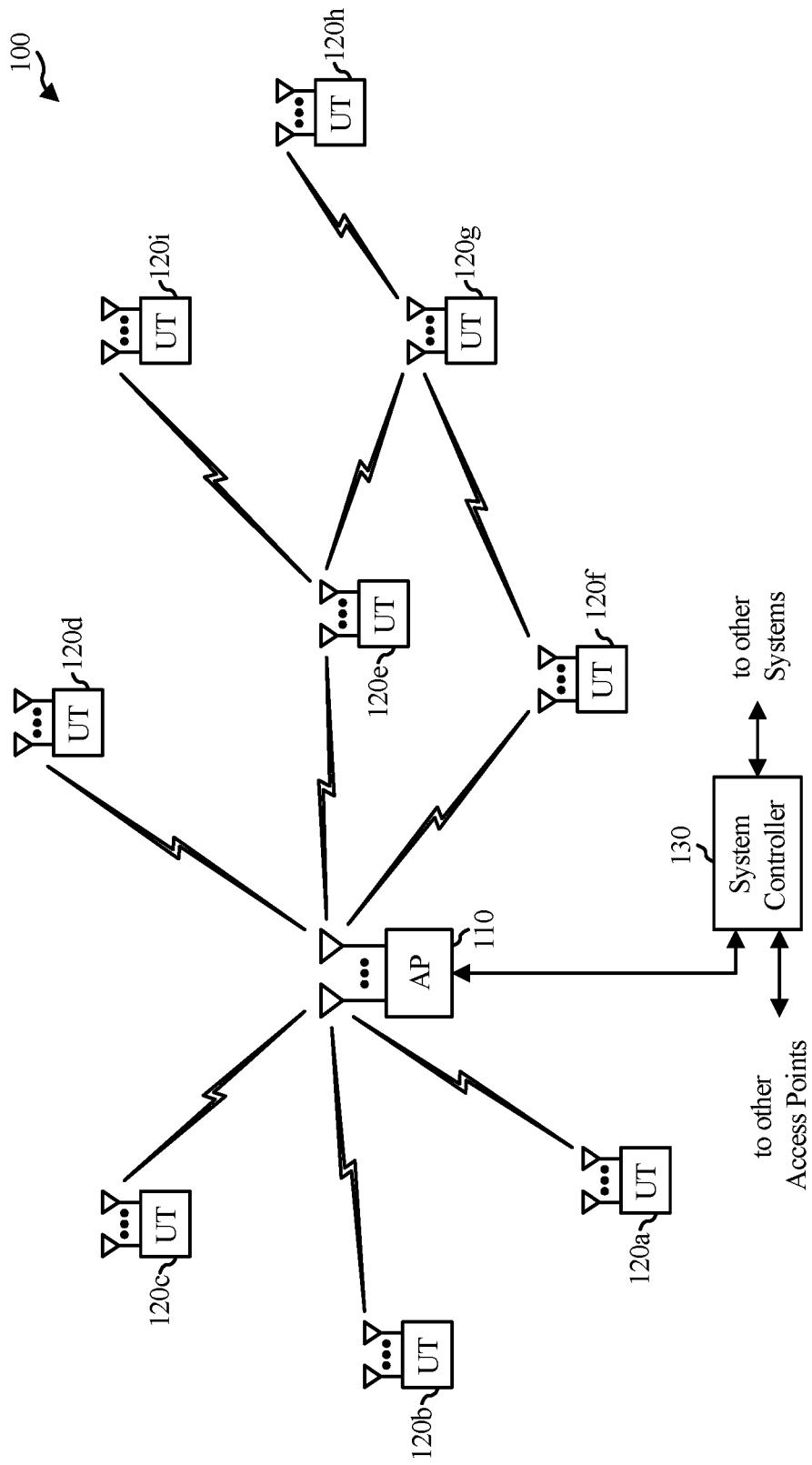
FIG. 1 is a diagram of an example wireless communications network, in accordance with certain aspects of the present disclosure.

Aspects of the present disclosure provide apparatuses, methods, processing systems, and computer-readable mediums for signaling parameters for communications between a wireless station and one or more other devices in peer-to-peer communications links. Peer-to-peer communications links may exist, for example, between a wireless station communicatively coupled to an access point and one or more peer wireless stations for which the wireless station serves as a soft access point (or virtual access point). In another example, peer-to-peer communications links may exist between different access points in a wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), next generation Node B (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 (also referred to herein as stations (STAs)) at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer or future user terminals being implemented with technology such as SDMA, OFDM or OFDMA to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
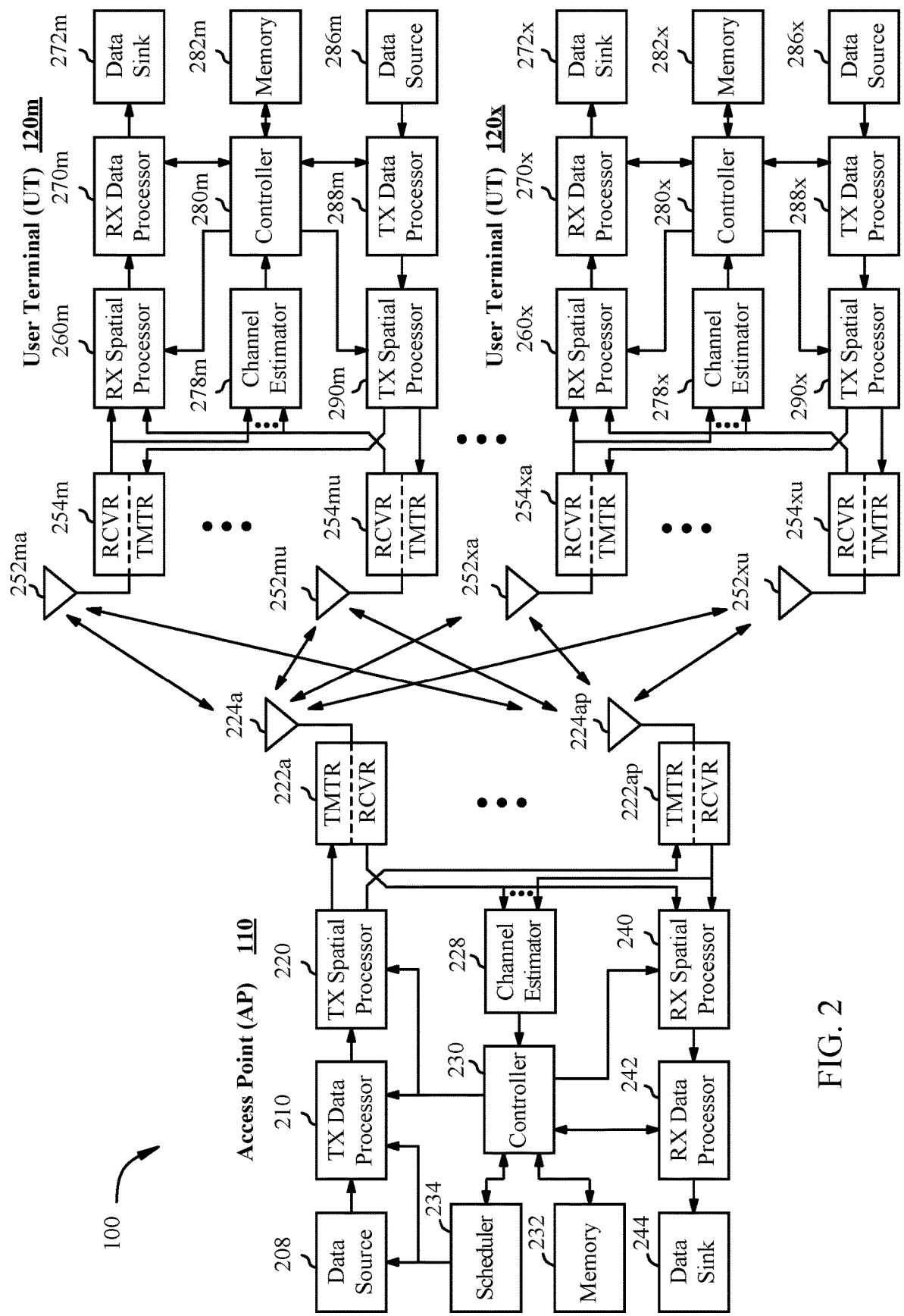
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
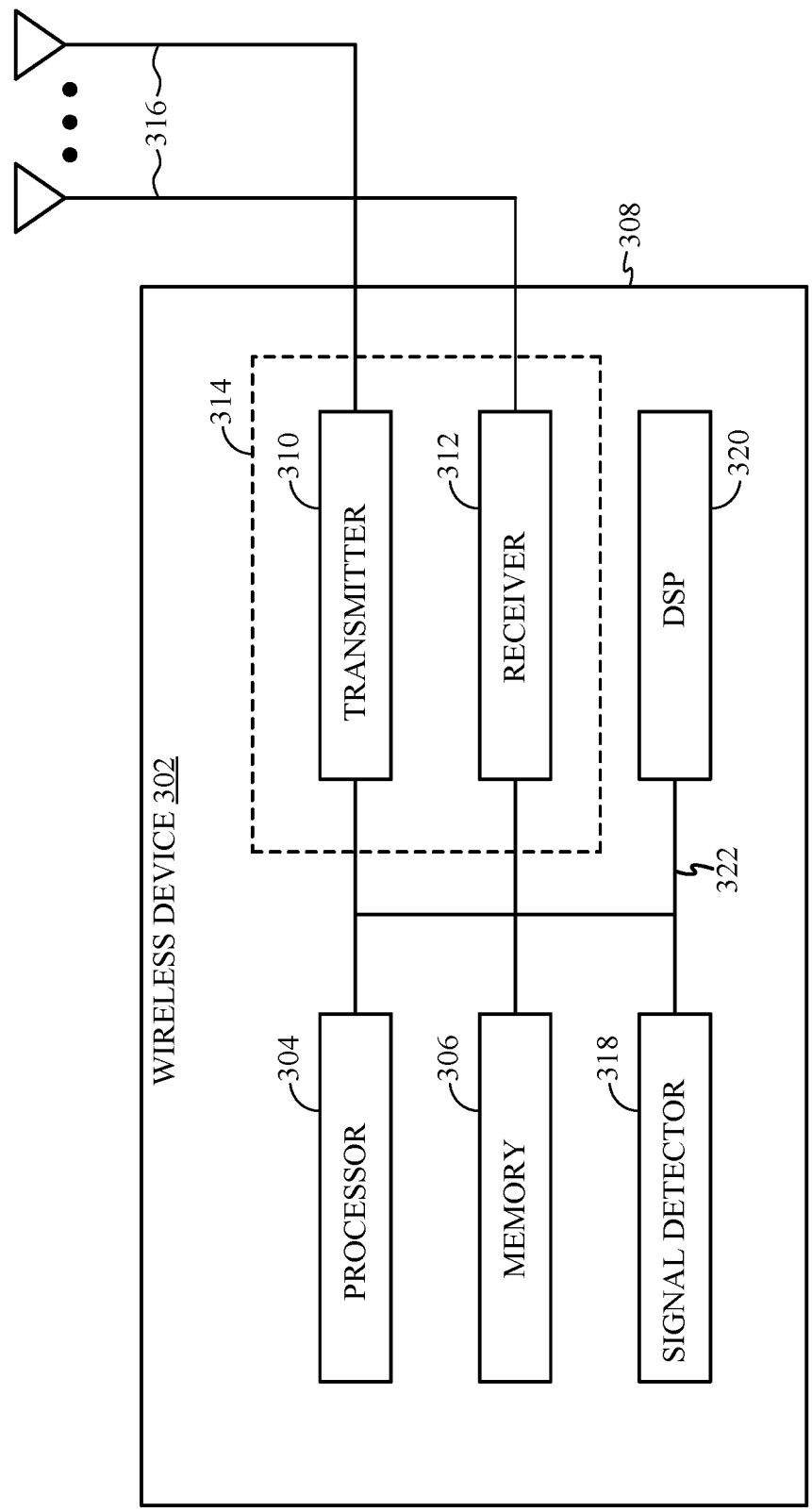
FIG. 3 is a diagram illustrating a wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Signaling Parameters for Peer-to-Peer Communications in Wireless Communication Systems Wireless communications systems may include systems in which a wireless station, such as a smartphone, tablet computer, laptop computer, desktop computer, or the like serves as a soft access point for one or more peer wireless stations. These peer wireless stations may be used for various real-time applications, such as extended reality or computer gaming, in which traffic may have stringent latency requirements (which may be referred to as "latency sensitive traffic"). To allow for the transmission of latency sensitive traffic in a wireless communications system, mechanisms such as a triggered transmission opportunity (TXOP) sharing procedure may be used to allow an access point to allocate a portion of time within a TXOP to a single non-access-point wireless station for transmission of data packets (e.g., PPDUs) between the non-AP wireless station and one or more peer wireless stations.

One example of parameters that may be defined for communications between devices in a network may include a subchannel puncturing pattern which identifies which subchannels are active and which subchannels are inactive during a TXOP. Generally, the puncturing pattern may be communicated from the AP to the wireless station via a disabled subchannel bitmap field included in one or more management frames transmitted by the AP, with each bit in the bitmap corresponding to a specific subchannel and a value indicating whether the subchannel is enabled (bit value of 0) or disabled (bit value of 1). The subchannels indicated as disabled in the disabled subchannel bitmap may not be used for communications with any device connected to the AP (e.g., any station that is a member of the basic service set (BSS) associated with the AP). Additional subchannels, however, may be punctured (not used) beyond those identified in the disabled subchannel bitmap. These additional subchannels may be punctured when the AP solicits a response from a connected wireless station by assigning resource units in the non-punctured channels. Thus, the bandwidth used for communications may be narrower than that identified by the AP in the disabled subchannel bitmap, but may not be wider than that identified by the AP in the disabled subchannel bitmap.

Peer wireless stations may not be communicatively coupled to the AP that signaled the parameters to a wireless station communicatively coupled to the AP, and thus, may not be aware of parameters established for communications between the AP and the wireless station to which these peer wireless stations are connected. Because the peer wireless stations may not be aware of these parameters, the peer wireless stations may communicate using a different set of parameters. For example, in the subchannel puncturing example discussed above, a peer wireless station may communicate on subchannels indicated as disabled in the disabled subchannel bitmap, which may violate a rule for communications in a wireless network stating that communications may not be performed on subchannels that are disabled.

Figure 4:
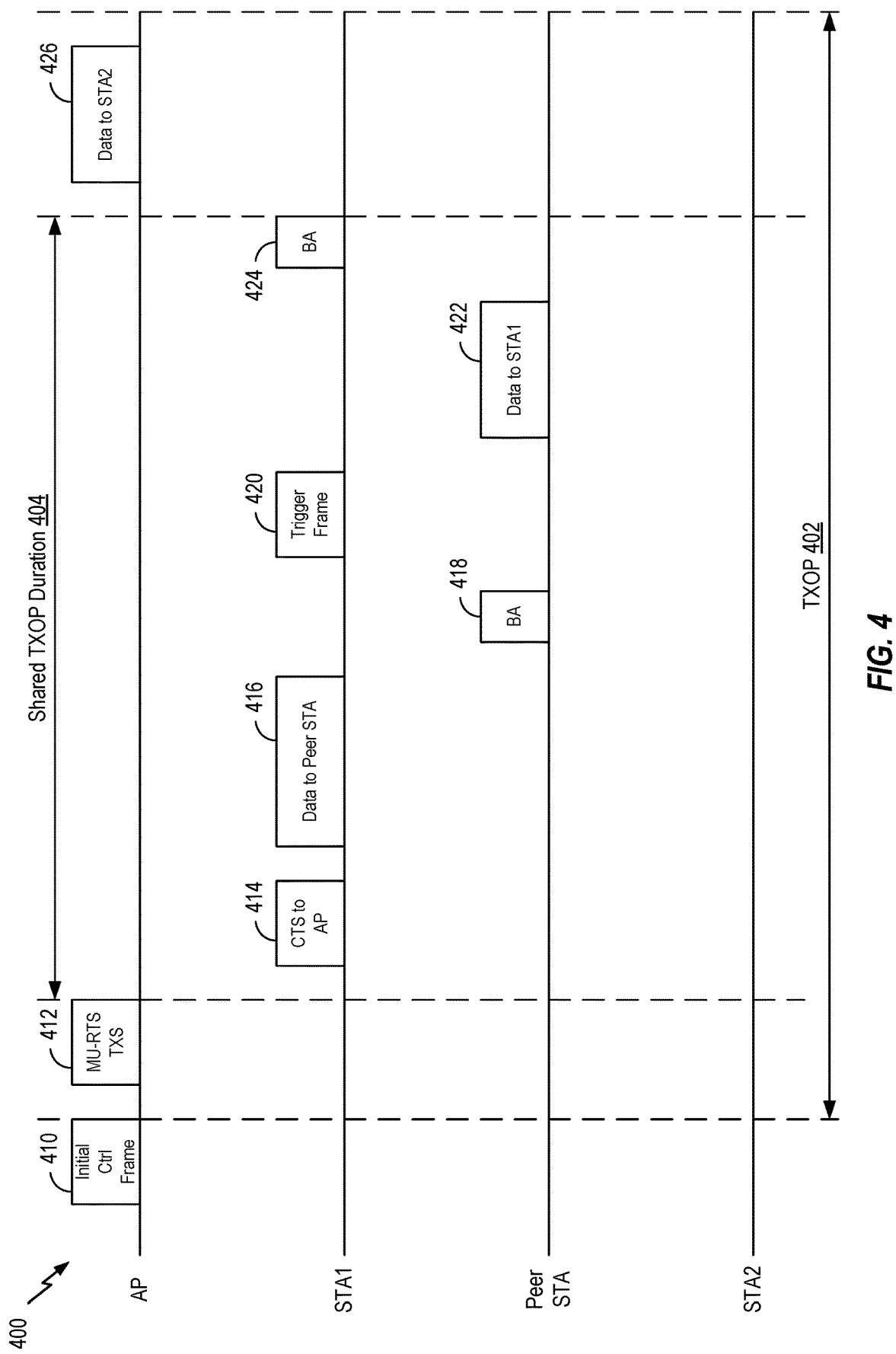
FIG. 4 illustrates a timeline for communications between a wireless station and a peer wireless station.

FIG. 4 illustrates an example timeline 400 for communications between a wireless station and a peer wireless station during a shared transmission opportunity (TXOP).

As illustrated, to establish a transmission opportunity 402 for STA1 and STA2, which may be wireless stations communicatively coupled to an AP, the AP may transmit (e.g., broadcast) an initial control frame 410, which may include various parameters for communications by one or more connected STAs during the TXOP. During this TXOP 402, a shared TXOP duration 404 may be established for STA1 to use in communicating with one or more peer STAs (e.g., VR headsets or other wireless stations using STA1 as a soft AP and lacking information about communication parameters established by the AP for the basic service set (BSS)). For example, the AP may transmit a multi-user (MU) ready to send (RTS) TXOP Sharing trigger message 412 to STA1 MU-RTS TXOP Sharing trigger message 412 may include information identifying the station to which the shared TXOP duration 404 is assigned, information identifying the AP, and information identifying the duration of the shared TXOP duration 404.

Subsequently, and prior to performing transmissions during the shared TXOP duration 404, STA1 can transmit a clear to send (CTS) frame 414 to the AP. Data frames 416 may be transmitted to the peer STA, and in response, the peer STA may transmit a block acknowledgment (BA) 418 to acknowledge receipt of the transmitted data frames from STA1 (or indicate that certain frames are to be retransmitted due to a failure to successfully receive those frames). During the shared TXOP duration 404, STA1 may allow the peer STA to transmit data to STA1. To do so, STA1 may transmit a trigger frame 420 to the peer STA. In response to receiving the trigger frame 420, the peer STA may transmit one or more data frames 422 to STA1, and STA1 may respond with a BA 424.

At the end of the shared TXOP duration 404, a portion of TXOP 402 may still remain for the AP to communicate with other STAs in the AP's basic service set. Between the end of shared TXOP duration 404 and the end of TXOP 402, thus, the AP may transmit data frames (e.g., data frames 426) to other stations (e.g., STA2) in the network.

As discussed, the peer STA may not be aware of the parameters for wireless communications established by the AP for members of the AP's BSS. Thus, it is possible for the peer STA to select transmission parameters that violate one or more transmission rules, such as transmitting on a bandwidth wider than that identified by the AP (e.g., transmitting on channels identified as punctured by the AP). Further, during peer-to-peer communications between a STA1 and the peer STA, it may be possible to use a different puncturing pattern from that identified in a subchannel puncturing pattern provided to STA1, and the AP may not be aware of this puncturing pattern. Thus, the AP may also violate the one or more transmission rules, such as transmitted on a bandwidth wider than that used for communications between STA1 and the peer STA during TXOP 402.

Aspects of the present disclosure provide techniques for signaling parameters for wireless communications to devices with which a wireless station communicates so that wireless devices in a network are aware of the parameters that define how communications are to be performed during a TXOP and do not violate rules for communications during a TXOP. By signaling these parameters to devices with which the wireless station communicates—such as APs and other peer wireless stations using the wireless station as a virtual (or soft) AP—aspects of the present disclosure may ensure that devices within a wireless communication network are aware of the parameters established for wireless communications even when those devices are not communicatively coupled to the AP and would ordinarily not be aware of such parameters. Thus, the devices with which the wireless station communicates may perform transmissions during a TXOP without violating rules defining how transmissions are to be performed during the TXOP (e.g., bandwidth limitations, etc.).

Figure 5:
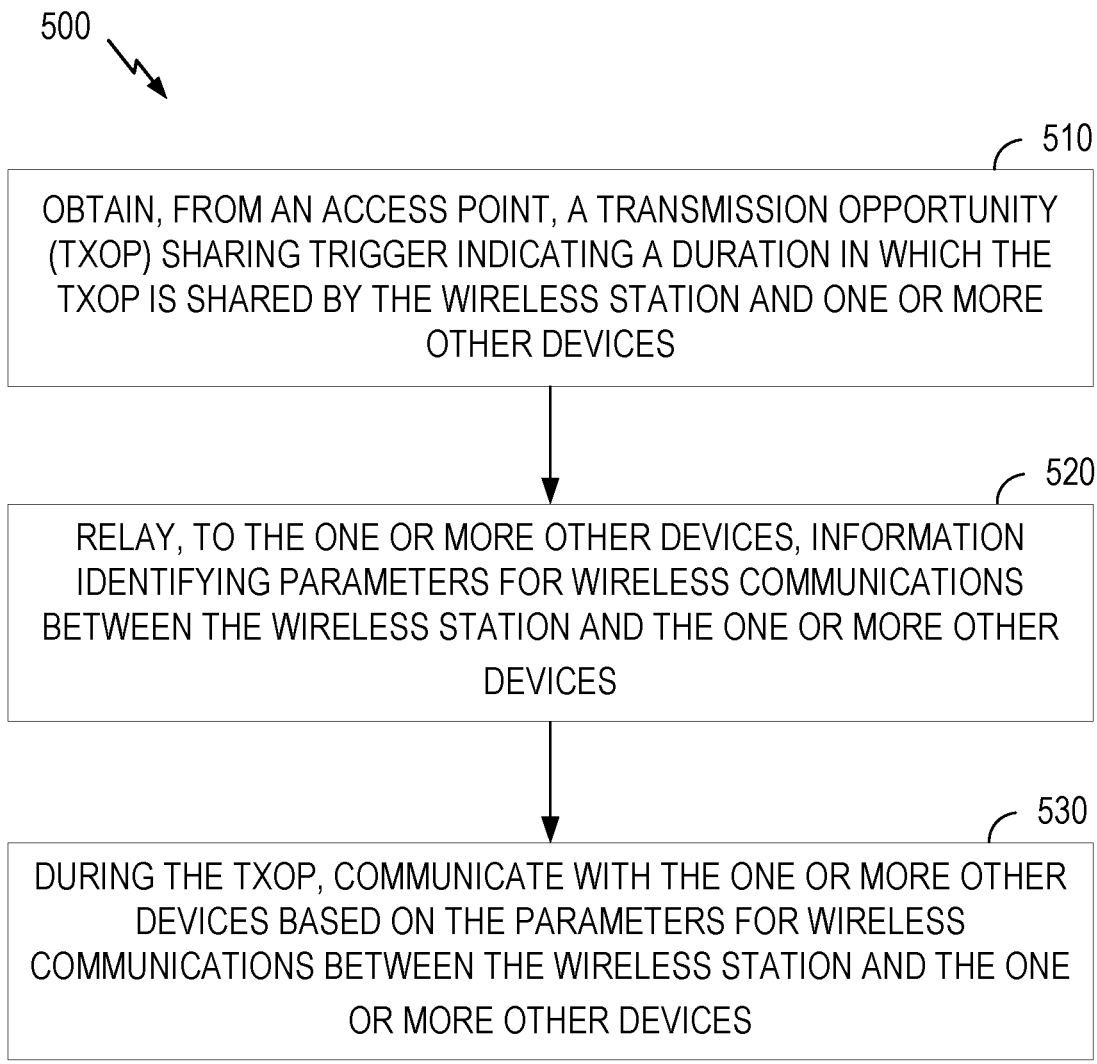
FIG. 5 is a flow diagram illustrating example operations for wireless communication by an access point, in accordance with certain aspects of the present disclosure.

FIG. 5 illustrates example operations 500 that may be performed at a wireless station (e.g., user terminal 120 illustrated in FIG. 1) to communicate with one or more other devices during a transmission opportunity, in accordance with certain aspects of the present disclosure.

As illustrated, operations 500 may begin at block 510, where the wireless station obtains, from an AP, a transmission opportunity (TXOP) sharing trigger indicating a duration in which the TXOP is shared by the wireless station and one or more other devices. As discussed, the TXOP sharing trigger may indicate a duration of a shared TXOP in which the wireless station can communicate with one or more other devices, such as other APs or peer wireless stations connected to the wireless station and using the wireless station as a virtual (or soft) AP.

At block 520, the wireless station relays, to the one or more other devices, information identifying parameters for wireless communications between the wireless station and the one or more other devices. In some aspects, the parameters for wireless communications may include, for example, a puncturing pattern associated with subchannels in the wireless communication network. The puncturing pattern may indicate which subchannels are active and which subchannels are disabled for the duration of the TXOP. It should be noted that the wireless device need not use all of the subchannels indicated as active in the puncturing pattern, and that additional subchannels beyond those identified by the AP may be punctured by the wireless device or the one or more other devices. In some aspects, the parameters for wireless communications may include a maximum channel bandwidth for wireless communications between the wireless station and the one or more other devices, a maximum transmission power for wireless communications between the wireless station and the one or more other devices, or the like. Other parameters may include information about a modulation and coding scheme (MCS) for wireless communications between the wireless station and the one or more other devices. Still further parameters may include a link identifier, spatial parameters, such as a number of spatial streams (NSS) or a number of space-time streams (NSTS) for wireless communications between the wireless station and the one or more other devices, timing information, and the like.

The parameters for wireless communications between the wireless station and the one or more other devices may be obtained from the AP and may be forwarded to the one or more other stations. In some aspects, the wireless station can relay the parameters for wireless communications between the wireless station and the one or more other devices via one or more dedicated information elements in a frame transmitted to the one or more other devices (e.g., one or more IEs in data frames transmitted to the one or more other devices, one or more IEs in management frames transmitted by the wireless station to the one or more other devices, a header of a frame transmitted to the one or more other devices, etc.). The information may be relayed to the one or more other devices, for example, via a quality of service (QoS) information element or a traffic specification (TSPEC) information element in a management frame. The information may also or alternatively be relayed to the one or more devices via at least one of a stream classification service (SCS) request frame or a target wake time (TWT) request frame used to indicate a time at which the one or more other devices are to operate (e.g., receive and/or transmit on a link between the wireless station and the one or more other devices). In some aspects, the wireless station can relay the parameters for wireless communications between the wireless station and the one or more other devices by outputting this information for transmission during a tunneled direct link setup (TDLS) procedure between the wireless station and the one or more other devices.

At block 530, during the TXOP, the wireless station communicates with the one or more other devices based on the parameters for wireless communications between the wireless station and the one or more other devices.

In some aspects, communications with the one or more other devices may be based on a bandwidth of a frame in which one or more of the TXOP sharing trigger or a clear to send (CTS) message is carried. The bandwidth may be, for example, based on an indicated maximum bandwidth supported for wireless communications between the wireless station and the one or more other devices. For example, the bandwidth used for communications with the one or more other devices may be less than the bandwidth of the frame in which the TXOP or CTS message is carried (e.g., may include additional punctured channels), but may not exceed the bandwidth of the frame in which the TXOP or CTS message is carried.

In some aspects, communications with the one or more devices may be based on temporal relationships between different portions of the TXOP. For example, the TXOP may be divided into a first portion and a second portion that is temporally after the first portion of the TXOP. The wireless station can communicate with the AP during the first portion of the TXOP and may communicate with the one or more other devices during the second portion of the TXOP. In some aspects, the second portion of the TXOP may be the remainder of the TXOP after the first portion of the TXOP. In some aspects, the second portion of the TXOP may be less than a remaining time in the TXOP so that other wireless stations can communicate during a third portion of the TXOP following the end of the second portion of the TXOP.

In some aspects, the wireless station may be aware of an ability for the one or more other devices (which may not be connected to the AP) to support puncturing. To allow the AP to also be aware of such support and generate parameters that are usable by the one or more other devices, the wireless station can signal, to the AP, information about the ability of the one or more other devices to support puncturing of one or more subchannels. In response to signaling information about the ability of the one or more other devices to support puncturing of one or more subchannels, the wireless station may obtain information about the punctured subchannels in the network, which may be received as a bitmap having a plurality of bits where each bit represents an activation or deactivation status of a specific subchannel.

In some aspects, the information may include information about subchannels punctured by the AP or by the wireless station (e.g., during the TXOP). For example, the wireless station may puncture one or more additional subchannels that may not have been previously marked as punctured. The wireless station can signal this information back to the AP so that the AP does not attempt to transmit on these disabled subchannels.

Figure 6:
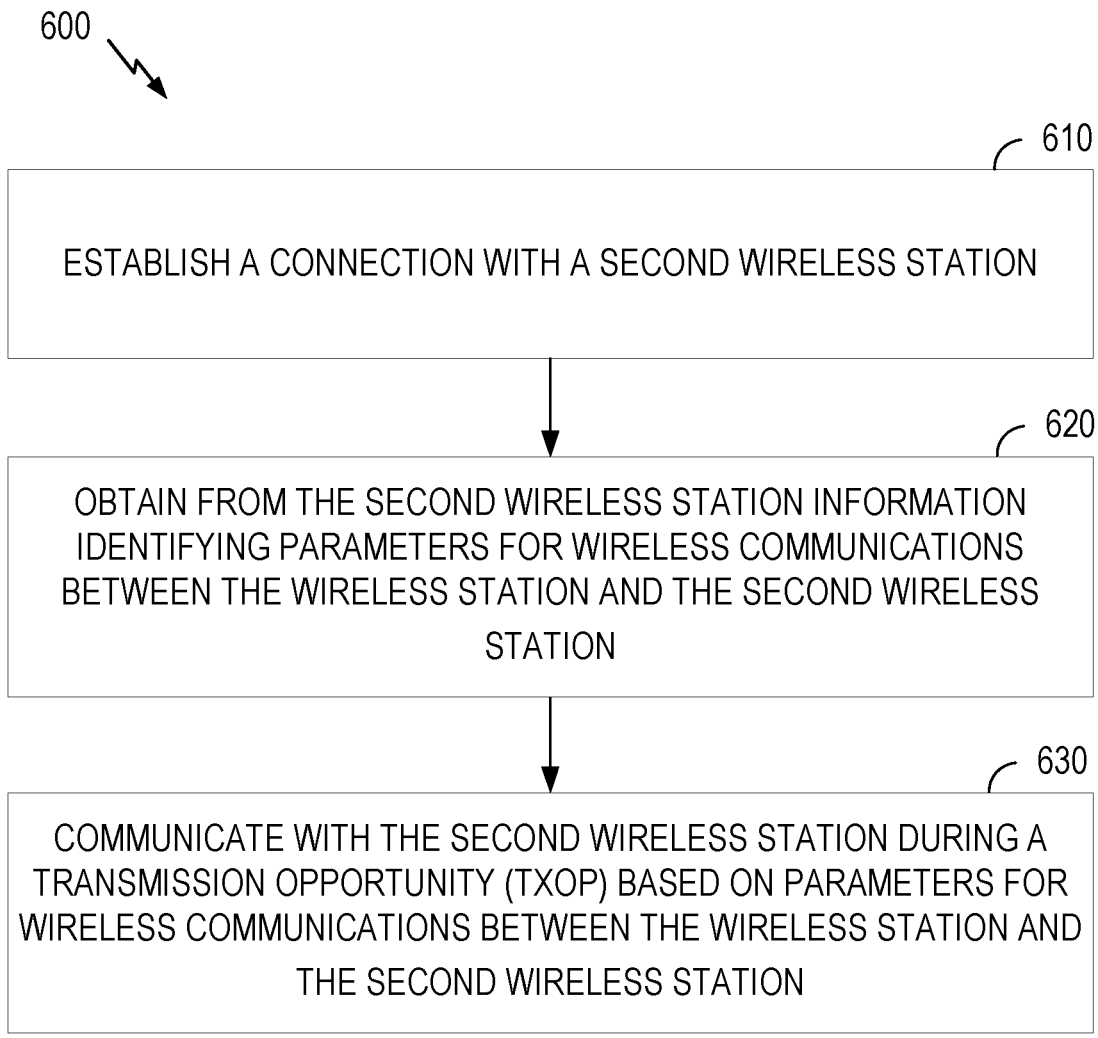
FIG. 6 is a flow diagram illustrating example operations for wireless communication by a source device, in accordance with certain aspects of the present disclosure.

FIG. 6 illustrates example operations 600 at a wireless station (e.g., user terminal 120 illustrated in FIG. 1 or another AP, such as an AP 110 illustrated in FIG. 1) to communicate with a second wireless station during a transmission opportunity, in accordance with certain aspects of the present disclosure. Generally, operations 600 may be performed at a peer wireless station to the second wireless station that is not also connected to the AP with which the second wireless station communicates. As discussed in further detail below, operations 600 may allow the wireless station, which may not be communicatively coupled to an AP, to be configured with transmission parameters that may allow the wireless station to communicate with the second wireless station without violating rules, for example, defining a maximum bandwidth that can be used for communications between the wireless station and the second wireless station or other communications rules.

As illustrated, operations 600 begin at block 610, where the wireless station establishes a connection with a second wireless station. In some aspects, the connection may be established between the wireless station and the second wireless station through a TDLS setup procedure between the wireless station and the second wireless station. The connection may be established prior to the establishment of any transmission opportunities during which the wireless station and the second wireless station can communicate with each other (e.g., transmit data to and receive data from the other).

At block 620, the wireless station obtains from the second wireless station identifying parameters for wireless communications between the wireless station and the second wireless station. As discussed, these parameters may include for example, a puncturing pattern associated with subchannels in a wireless communications network. The puncturing pattern may indicate whether a subchannel is activated or deactivated. The puncturing panel may be defined by an AP to which the second wireless station is connected or may be defined by the second wireless station (e.g., for use during a specific TXOP).

At block 630, the wireless station communicates with the second wireless station during a TXOP based on parameters for wireless communications between the wireless station and the second wireless station. Because the parameters may have been forwarded from the AP to the wireless station via the second wireless station or defined by the second wireless station, the wireless station may be aware of the proper parameters for communications during the TXOP and may not, based on having obtained these parameters, perform communications using parameters that would violate one or more defined rules for communications during the TXOP (e.g., exceeding a maximum bandwidth during the TXOP).

In some aspects, the wireless station may communicate based on subchannels punctured by an AP with which the second wireless station is connected and subchannels punctured by the second wireless station. For example, the wireless station may communicate based on an intersection of the subchannels punctured by the AP and the subchannels punctured by the second wireless station. The subchannels may be dynamically punctured for communications, during the TXOP, between the wireless station and the second wireless station.

In some aspects, the TXOP may be divided into a first portion and a second portion. The second portion may follow the first portion temporally. Generally, the first portion may be a portion reserved for communications between the AP and the second wireless station, and communications between the wireless station and the second wireless station may be performed during the second portion of the TXOP.

Figure 7:
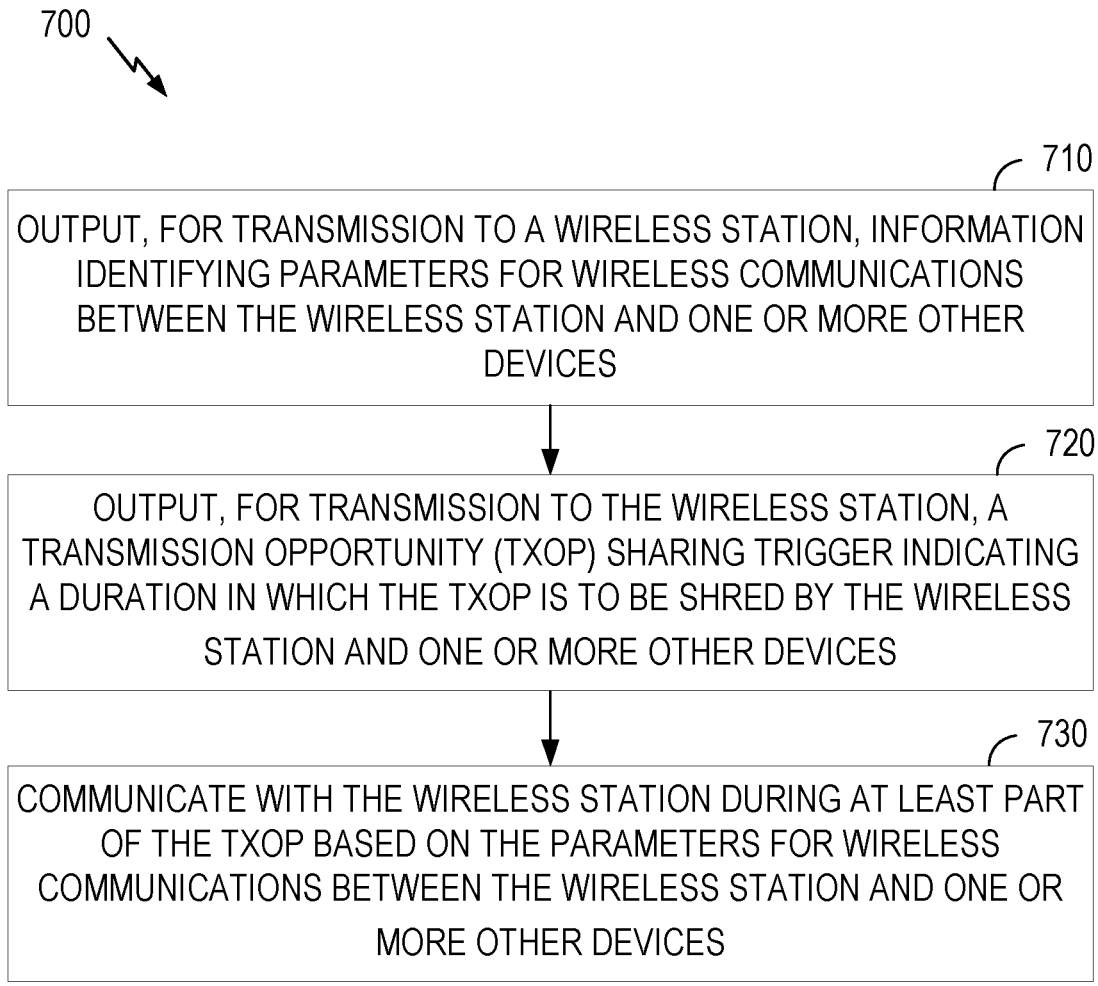
FIG. 7 is a flow diagram illustrating example operations for wireless communication by a target device, in accordance with certain aspects of the present disclosure.

FIG. 7 illustrates example operations 700 at an access point (e.g., AP 110 illustrated in FIG. 1) for communicating with a wireless station based on parameters defined for communications between the AP and the wireless station and parameters of communications between the wireless station and one or more other devices using the wireless station as a soft (or virtual) AP. Generally, by communicating these parameters to the AP, the AP may be aware of limitations imposed by the parameters for communications between the wireless station and the one or more other devices, and the AP may communicate with other stations in the basic service set without violating rules restricting communications during a TXOP based on the parameters for communications between the wireless station and the one or more other devices (e.g., bandwidth parameters, etc.).

As illustrated, operations 700 begin at block 710, where the AP outputs, for transmission to a wireless station, information identifying parameters for wireless communications between the wireless station and one or more other devices. As discussed, these one or more other devices may include, for example, other APs or peer stations that use the wireless station as a soft (or virtual) AP. In some aspects, these parameters may include information about the subchannels in a wireless communication network, such as a channel puncturing bitmap or other puncturing pattern information identifying channels that are punctured, or disabled, for communications between the AP and the wireless station (and thus, should be punctured for communications between the wireless station and one or more other devices during a transmission opportunity).

At block 720, the AP outputs, for transmission to the wireless station, a TXOP sharing trigger indicating a duration in which the TXOP is to be shared by the wireless station and one or more other devices. The TXOP may be divided, for example, into a first portion in which the AP can communicate with the wireless station, and a second portion temporally after the first portion in which the wireless station can perform peer-to-peer communications with one or more other devices. The second portion may be the remainder of the TXOP or may be a portion that allows for the AP to communicate with other connected wireless stations until the end of the TXOP based on the identified parameters for wireless communications between the wireless station and the one or more other devices as well as parameters signaled to the AP and used during communications between the wireless station and the one or more other devices.

At block 730, the AP communicates with the wireless station during at least part of the TXOP based on the parameters for wireless communications between the wireless station and the one or more other devices.

In some aspects, the AP can obtain, from the wireless station, information about an ability of the one or more other devices to support puncturing of one or more subchannels. The information identifying the parameters for wireless communications may be based on the ability of the other devices to support puncturing of the one or more subchannels. For example, the ability of the other devices to support puncturing may indicate a maximum number of subchannels that may be punctured, and the AP may indicate up to the maximum number of punctured subframes in the parameters output for transmission to the wireless station.

In some aspects, to determine which subchannels are punctured and to communicate such information to the wireless station (e.g., for distribution to the one or more other devices, such as peer stations, connected to the wireless station), the AP may perform a "sniffing" operation. During this sniffing operation, the AP can monitor one or more subchannels for transmissions on each of the one or more subchannels during the TXOP (or at least the portion of the TXOP reserved for communications between the wireless station and the one or more other devices). Channels having traffic may be marked as unpunctured, while channels having no traffic may be marked as punctured, and the puncturing pattern may be identified based on the results of the sniffing operation.

In some aspects, as discussed above, the wireless station may disable (or puncture) further subchannels beyond those indicated as punctured in the signaling output for transmission to the wireless station at block 710. In such a case, the AP may obtain information identifying one or more punctured subchannels that are punctured during the TXOP. Subsequent communications between the AP and the wireless station (and/or the one or more other devices) may be further based on the identified punctured channels.

In some aspects, the AP may further output, for transmission to the wireless station, information identifying transmission parameters for wireless communications between the wireless station and the one or more other devices. These parameters may include a variety of parameters, as discussed above, including a channel bandwidth, a maximum transmission power, an MCS, a link identifier, spatial parameters (e.g., NSS, NSTS, etc.), and/or timing information. In some aspects, the link identifier may be output as a link identifier bitmap in which a bit set to high in the bitmap indicates the link identifier used for communications between the AP and the wireless station.

Example Wireless Communication Devices

Figure 8:
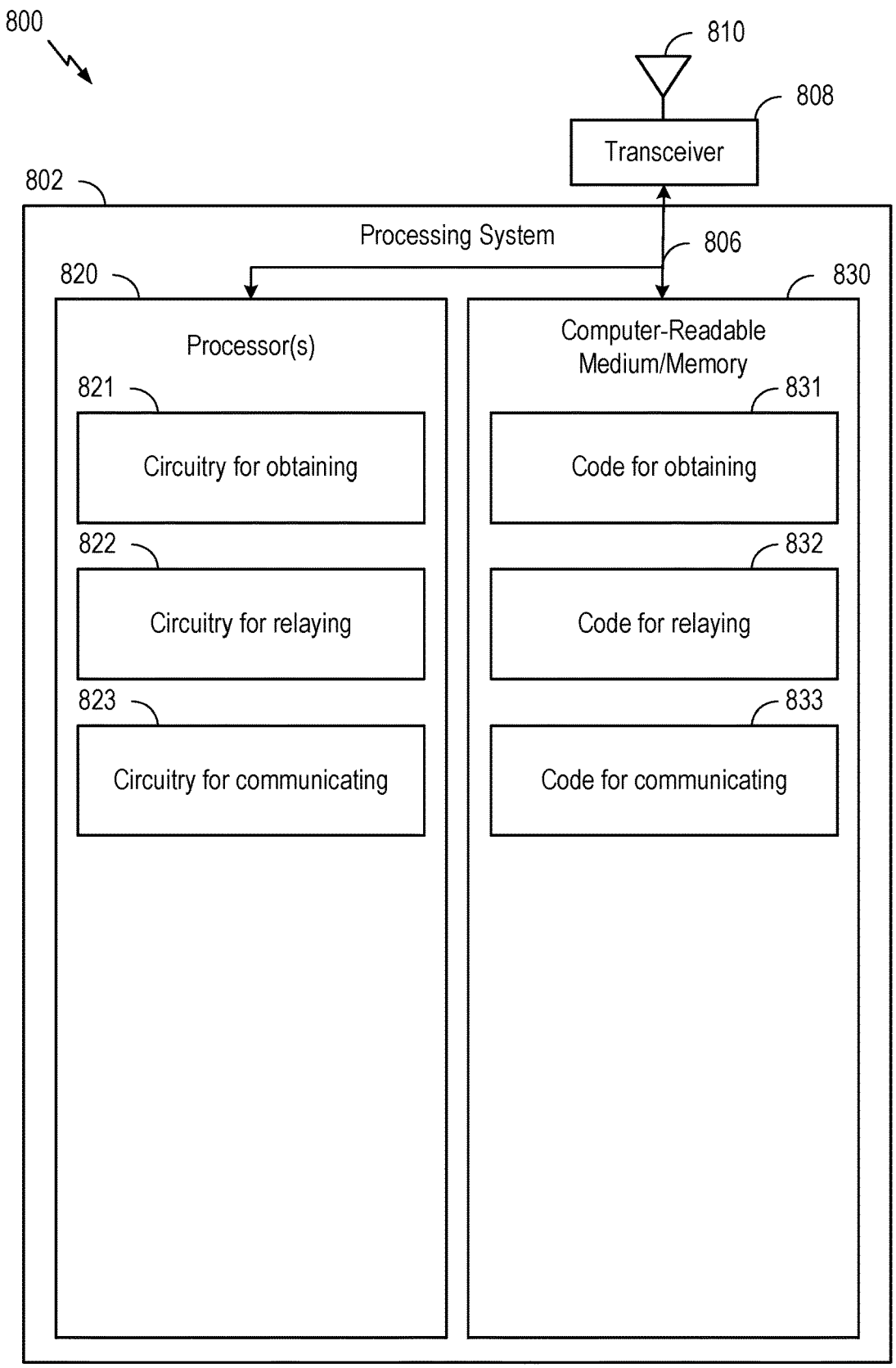
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 5. In some examples, communication device 800 may be a user terminal 120 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 5, or other operations for performing the various techniques discussed herein.

In the depicted example, computer-readable medium/memory 830 stores code 831 for obtaining, code 832 for relaying, and code 833 for communicating.

In the depicted example, the one or more processors 820 include circuitry configured to implement the code stored in the computer-readable medium/memory 830, including circuitry 821 for obtaining, circuitry 822 for relaying, and circuitry 823 for communicating.

Various components of communications device 800 may provide means for performing the methods described herein, including with respect to FIG. 5.

In some examples, means for obtaining may include the RX spatial processor 260, RX data processor 270, controller 280, transceivers 254 and/or antenna(s) 252 of the user terminal 120 illustrated in FIG. 2 and/or processor 820, transceiver 808, and antenna 810 of the communication device 800 in FIG. 8.

In some examples, means for relaying may include the TX spatial processor 290, TX data processor 288, controller 280, transceivers 254 and/or antenna(s) 252 of the user terminal 120 illustrated in FIG. 2 and/or processor 820, transceiver 808 and antenna 810 of the communication device 800 in FIG. 8.

In some examples, means for communicating may include the RX spatial processor 260, RX data processor 270, controller 280, TX spatial processor 290, TX data processor 288, transceivers 254 and/or antenna(s) 252 of the user terminal 120 illustrated in FIG. 2 and/or processor 820, transceiver 808 and antenna 810 of the communication device 800 in FIG. 8.

Notably, FIG. 8 is an example, and many other examples and configurations of communication device 800 are possible.

Figure 9:
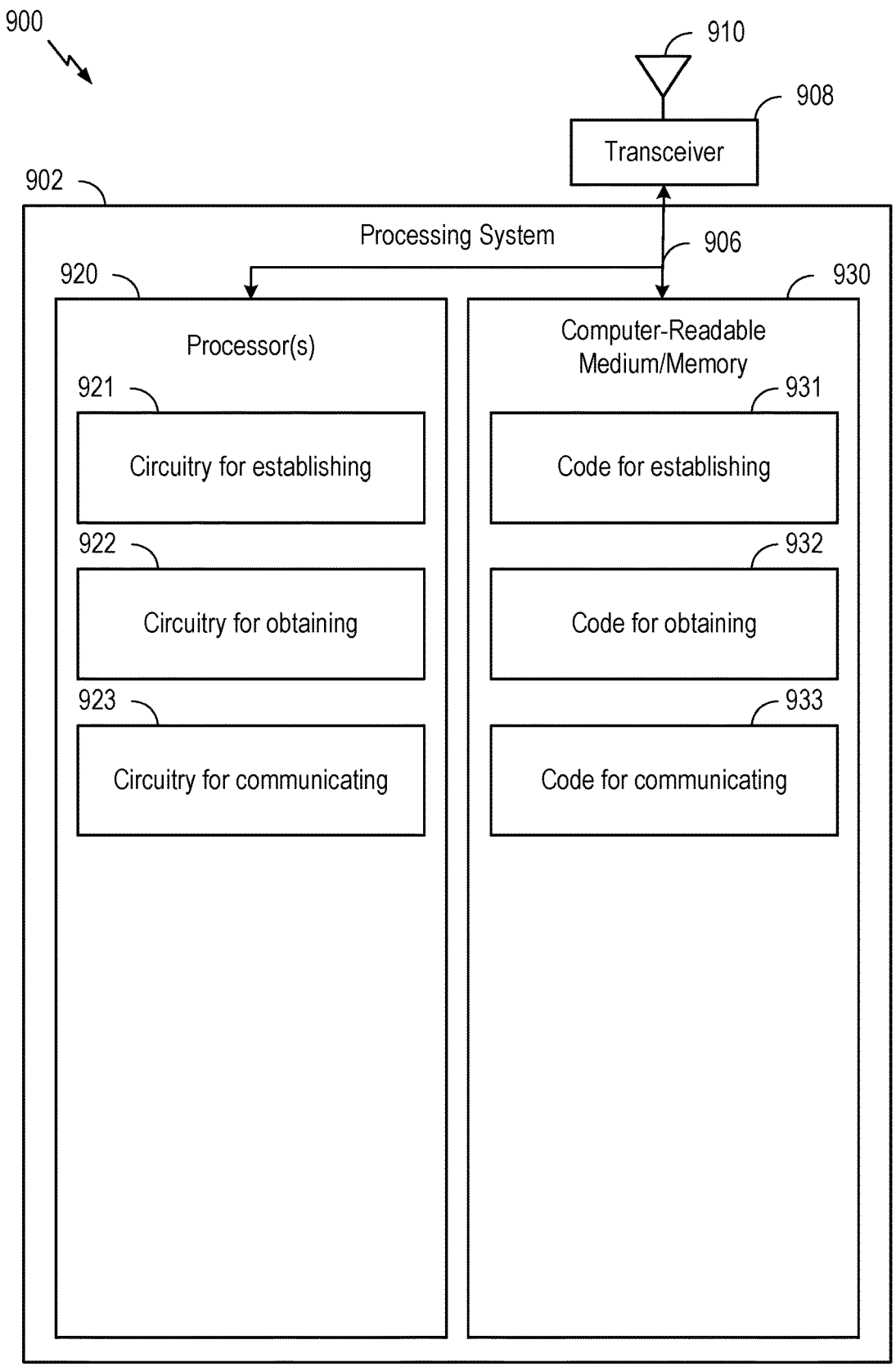
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 6. In some examples, communication device 900 may be a user terminal 120 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6, or other operations for performing the various techniques discussed herein.

In the depicted example, computer-readable medium/memory 930 stores code 931 for establishing, code 932 for obtaining, and code 933 for communicating.

In the depicted example, the one or more processors 920 include circuitry configured to implement the code stored in the computer-readable medium/memory 930, including circuitry 921 for establishing, circuitry 922 for obtaining, and circuitry 923 for communicating.

Various components of communications device 900 may provide means for performing the methods described herein, including with respect to FIG. 6.

In some examples, means for establishing may include the RX spatial processor 260, RX data processor 270, controller 280, TX spatial processor 290, TX data processor 288, transceivers 254 and/or antenna(s) 252 of the user terminal 120 illustrated in FIG. 2 and/or processor 920, transceiver 908 and antenna 910 of the communication device 900 in FIG. 9.

In some examples, means for obtaining may include the RX spatial processor 260, RX data processor 270, controller 280, transceivers 254 and/or antenna(s) 252 of the user terminal 120 illustrated in FIG. 2 and/or processor 920, transceiver 908, and antenna 910 of the communication device 900 in FIG. 9.

In some examples, means for communicating may include the RX spatial processor 260, RX data processor 270, controller 280, TX spatial processor 290, TX data processor 288, transceivers 254 and/or antenna(s) 252 of the user terminal 120 illustrated in FIG. 2 and/or processor 920, transceiver 908, and antenna 910 of the communication device 900 in FIG. 9.

Notably, FIG. 9 is an example, and many other examples and configurations of communication device 900 are possible.

Figure 10:
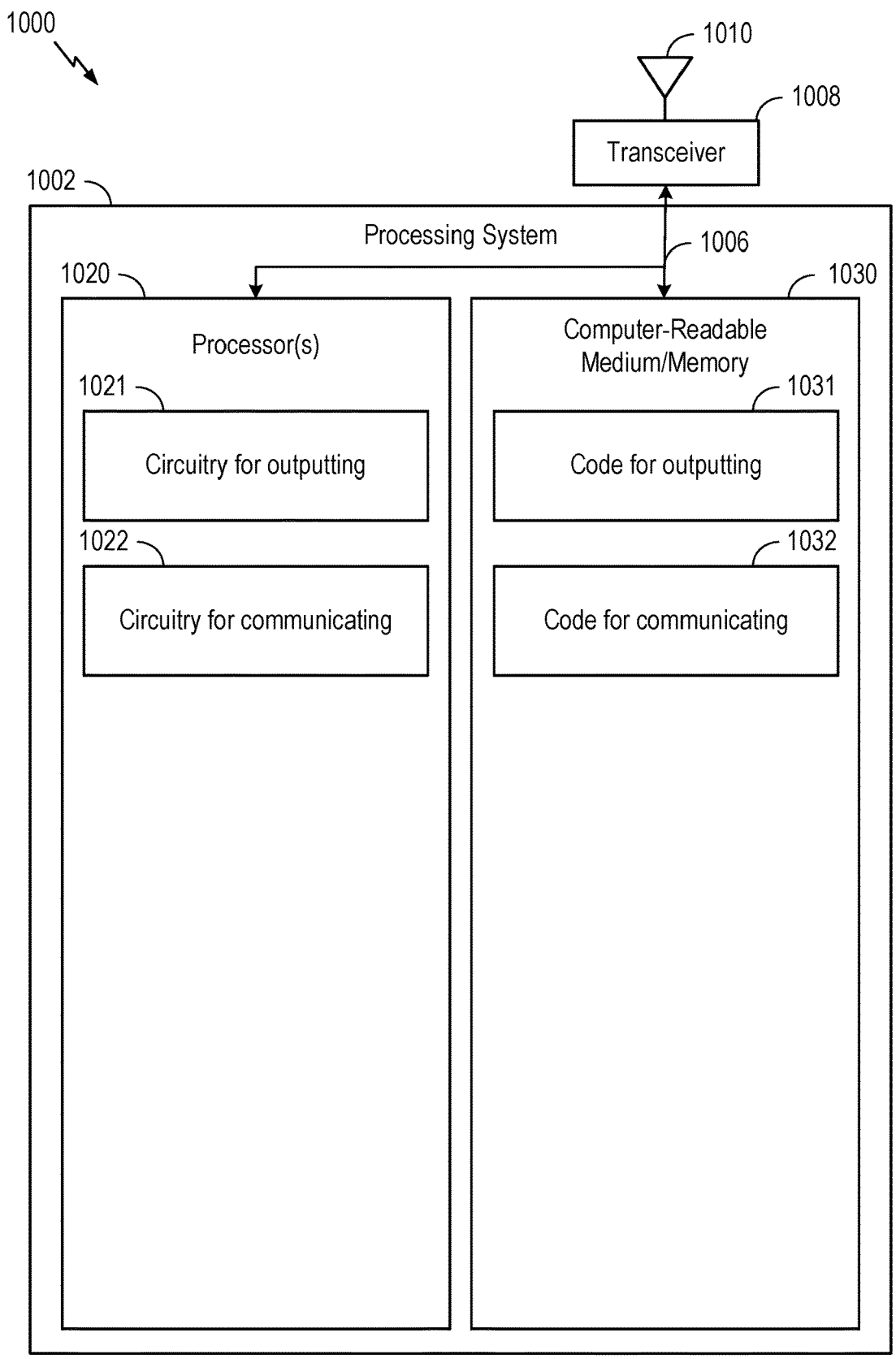
FIG. 10 depicts aspects of an example communications device.

FIG. 10 depicts an example communications device 1000 that includes various components operable, configured, or adapted to perform operations for the techniques disclosed herein, such as the operations depicted and described with respect to FIG. 7. In some examples, communication device 1000 may be an AP 110 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 7, or other operations for performing the various techniques discussed herein.

In the depicted example, computer-readable medium/memory 1030 stores code 1031 for outputting and code 1032 for communicating.

In the depicted example, the one or more processors 1020 include circuitry configured to implement the code stored in the computer-readable medium/memory 1030, including circuitry 1021 for outputting and circuitry 1022 for communicating.

Various components of communications device 1000 may provide means for performing the methods described herein, including with respect to FIG. 7.

In some examples, means for outputting may include the TX data processor 210, TX spatial processor 220, controller 230, transceivers 232, and/or antenna(s) 224 of the AP 110 illustrated in FIG. 2 and/or processor 1020, transceiver 1008 and antenna 1010 of the communication device 1000 in FIG. 10.

In some examples, means for communicating may include the TX data processor 210, TX spatial processor 220, controller 230, RX spatial processor 242, RX data processor 242, transceivers 232, and/or antenna(s) 224 of the AP illustrated in FIG. 2 and/or processor 1020, transceiver 1008, and antenna 1010 of the communication device 1000 in FIG. 10.

In some cases, rather than actually transmitting, for example, signals and/or data, a device may have an interface to output signals and/or data for transmission (a means for outputting). For example, a processor may output signals and/or data, via a bus interface, to a radio frequency (RF)

front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for forwarding, means for selecting, means for replacing, and means for outputting may include various processing system components, such as: the one or more processors 1020 in FIG. 10, or aspects of the AP 110 depicted in FIG. 2, including receive processor 240, transmit processor 220, TX data processor 210, and/or controller 230.

Notably, FIG. 10 is an example, and many other examples and configurations of communication device 1000 are possible.

EXAMPLE ASPECTS

Implementation examples are described in the following numbered aspects:

Aspect 1: A method for wireless communications at a wireless station, comprising: obtaining, from an access point (AP), a transmission opportunity (TXOP) sharing trigger indicating a duration in which a TXOP is shared by the wireless station and one or more other devices; relaying, to the one or more other devices, information identifying parameters for wireless communications between the wireless station and the one or more other devices; and during the TXOP, communicating with the one or more other devices based on the parameters for wireless communications between the wireless station and the one or more other devices.

Aspect 2: The method of Aspect 1, wherein the one or more other devices comprise one or more peer devices communicatively coupled to the wireless station.

Aspect 3: The method of any one of Aspects 1 through 2, wherein the one or more other devices comprise a second AP.

Aspect 4: The method of any one of Aspects 1 through 3, wherein the parameters for wireless communications between the wireless station and the one or more other devices comprises a puncturing pattern associated with subchannels.

Aspect 5: The method of Aspect 4, further comprising: signaling, to the AP, an ability of the one or more other devices to support puncturing of one or more subchannels; and after the signaling, obtaining a bitmap identifying one or more subchannels punctured by the AP, wherein the information identifying the puncturing pattern associated with subchannels comprises the obtained bitmap.

Aspect 6: The method of any one of Aspects 1 through 5, wherein relaying the information identifying the parameters for wireless communications between the wireless station and the one or more other devices comprises outputting the information for transmission during a tunneled direct link setup (TDLS) procedure.

Aspect 7: The method of Aspect 6, wherein the information comprises information identifying one or more subchannels punctured by the AP.

Aspect 8: The method of any one of Aspects 6 through 7, wherein the information comprises information identifying one or more subchannels punctured by the wireless station.

Aspect 9: The method of any one of Aspects 1 through 8, further comprising: puncturing one or more subchannels for wireless communications between the wireless station and the one or more other devices during the TXOP.

Aspect 10: The method of Aspect 9, further comprising: outputting for transmission to the AP information identifying the one or more subchannels punctured during the TXOP.

Aspect 11: The method of any one of Aspects 1 through 10, wherein the information identifying the parameters for wireless communications between the wireless station and the one or more other devices is carried in a header of a frame transmitted to the one or more other devices.

Aspect 12: The method of any one of Aspects 1 through 11, wherein communicating with the one or more other devices comprises communicating with the one or more other devices based on a bandwidth of a frame in which at least one of the TXOP sharing trigger or a clear to send message is carried.

Aspect 13: The method of Aspect 12, further comprising: outputting for transmission to the AP an indication of a maximum bandwidth supported for wireless communications between the wireless station and the one or more other devices, wherein the bandwidth of the frame is based on the indicated maximum bandwidth.

Aspect 14: The method of any one of Aspects 1 through 13, further comprising: communicating with the AP during a first portion of the TXOP, wherein communicating with the one or more other devices comprises communicating with the one or more other devices during a second portion of the TXOP temporally after the first portion of the TXOP.

Aspect 15: The method of Aspect 14, wherein the second portion of the TXOP comprises a remainder of the TXOP after the first portion of the TXOP.

Aspect 16: The method of any one of Aspects 1 through 15, further comprising: obtaining from the AP information identifying the parameters for wireless communications between the wireless station and the one or more other devices.

Aspect 17: The method of any one of Aspects 1 through 16, wherein the parameters for wireless communications between the wireless station and the one or more devices comprise at least one of channel bandwidth for wireless communications between the wireless station and the one or more other devices, a maximum transmission power for wireless communications between the wireless station and the one or more other devices, a modulation and coding scheme (MCS) for wireless communications between the wireless station and the one or more other devices, a link identifier for wireless communications between the wireless station and the one or more other devices, spatial parameters for wireless communications between the wireless station and the one or more other devices, or timing information associated with a link between the wireless station and the one or more other devices.

Aspect 18: The method of any one of Aspects 1 through 17, wherein the information identifying the parameters for wireless communications between the wireless station and the one or more other devices is relayed via a dedicated information element in a frame transmitted to the one or more other devices.

Aspect 19: The method of any one of Aspects 1 through 18, wherein the information identifying the parameters for wireless communications between the wireless station and the one or more other devices is relayed via a quality of service (QoS) information element or a traffic specification (TSPEC) information element.

Aspect 20: The method of any one of Aspects 1 through 19, wherein the information identifying the parameters for wireless communications between the wireless station and the one or more other devices is relayed via at least one of a stream classification service (SCS) request frame or a target wake time (TWT) request frame.

Aspect 21: A method for wireless communications at a wireless station, comprising: establishing a connection with a second wireless station; obtaining from the second wireless station information identifying parameters for wireless communications between the wireless station and the second wireless station; and communicating with the second wireless station during a transmission opportunity (TXOP) based on the parameters for wireless communications between the wireless station and the second wireless station.

Aspect 22: The method of Aspect 21, wherein the parameters for wireless communications between the wireless station and the second wireless station comprise a puncturing pattern associated with subchannels, and wherein the puncturing pattern is obtained via a bitmap in a management frame.

Aspect 23: The method of any one of Aspects 21 through 22, wherein the parameters for wireless communications between the wireless station and the second wireless station is obtained during a tunneled direct link setup (TDLS) procedure with the second wireless station.

Aspect 24: The method of any one of Aspects 21 through 22, further comprising: dynamically puncturing one or more subchannels for wireless communications between the wireless station and the second wireless station.

Aspect 25: The method of any one of Aspects 21 through 24, wherein: the TXOP is divided into a first portion and a second portion temporally after the first portion, and communicating with the second wireless station comprises communicating with the second wireless station during a second portion of a transmission opportunity (TXOP).

Aspect 26: The method of any one of Aspects 21 through 25, wherein the information obtained from the second wireless station comprises a puncturing pattern defined by an access point (AP) to which the second wireless communication is connected.

Aspect 27: The method of any one of Aspects 21 through 26, wherein the information obtained from the second wireless station comprises a puncturing pattern defined by the second wireless station.

Aspect 28: The method of any one of Aspects 21 through 27, wherein communicating with the second wireless station during the TXOP comprises communicating with the second wireless station based on subchannels punctured by an access point (AP) to which the second wireless communication is connected and subchannels punctured by the second wireless station.

Aspect 29: The method of Aspect 28, wherein communicating based on the subchannels punctured by the AP and subchannels punctured by the second wireless station comprises communicating based on an intersection of the subchannels punctured by the AP and the subchannels punctured by the second wireless station.

Aspect 30: A method for wireless communications at an access point (AP), comprising: outputting, for transmission to a wireless station, information identifying parameters for wireless communications between the wireless station and one or more other devices; outputting, for transmission to the wireless station, a transmission opportunity (TXOP) sharing trigger indicating a duration in which the TXOP is to be shared by the wireless station and one or more other devices; and communicating with the wireless station during at least part of the TXOP based on the parameters for wireless communications between the wireless station and one or more other devices.

Aspect 31: The method of Aspect 30, wherein the parameters for communications between the wireless station and the one or more other devices comprises a puncturing pattern associated with subchannels.

Aspect 32: The method of Aspect 31, further comprising: obtaining from the wireless station an ability of the one or more other devices to support puncturing of one or more subchannels, wherein the information identifying the puncturing pattern is based on the ability of the one or more other devices to support puncturing of the one or more subchannels.

Aspect 33: The method of any one of Aspects 31 through 32, further comprising: monitoring one or more subchannels for transmissions on each of the one or more subchannels during the TXOP in which the wireless station and one or more other devices are communicating; and identifying the puncturing pattern based on monitoring the one or more subchannels.

Aspect 34: The method of any one of Aspects 30 through 33, further comprising: obtaining, from the wireless station, information identifying one or more punctured subchannels for wireless communications between the wireless station and the one or more other devices that are punctured during the TXOP, wherein the communication between the AP and the wireless station is further based on the identified one or more punctured subchannels.

Aspect 35: The method of any one of Aspects 30 through 34, wherein the TXOP is divided into a first portion and a second portion, and communicating with the wireless station based on the parameters for wireless communications between the wireless station and the one or more other devices comprises communicating with the wireless station during only the first portion of the TXOP.

Aspect 36: The method of Aspect 35, wherein the second portion of the TXOP comprises a remainder of the TXOP temporally after the first portion of the TXOP.

Aspect 37: The method of any one of Aspects 30 through 36, further comprising: outputting, for transmission to the wireless station, information identifying transmission parameters for wireless communications between the wireless station and the one or more other devices.

Aspect 38: The method of any one of Aspects 30 through 37, wherein the parameters for wireless communications between the wireless station and the one or more devices comprise at least one of a channel bandwidth for wireless communications between the wireless station and the one or more other devices, a maximum transmission power for wireless communications between the wireless station and the one or more other devices, a modulation and coding scheme for wireless communications between the wireless station and the one or more other devices, a link identifier for wireless communications between the wireless station and the one or more other devices, spatial parameters for wireless communications between the wireless station and the one or more other devices, or timing information associated with a link between the wireless station and the one or more other devices.

Aspect 39: The method of Aspect 38, wherein the link identifier comprises a link identifier bitmap.

Aspect 40: An apparatus for wireless communications, comprising: a memory comprising instructions; and one or more processors configured to execute the instructions and cause the apparatus to perform a method in accordance with any one of Aspects 1-39.

Aspect 41: An access terminal, comprising: a transceiver; a memory comprising instructions; and one or more processors configured to execute the instructions and cause the access terminal to perform a method in accordance with any one of Aspects 1-20, wherein the transceiver is configured to receive the transmission opportunity (TXOP) sharing trigger.

Aspect 42: An access terminal, comprising: a transceiver; a memory comprising instructions; and one or more processors configured to execute the instructions and cause the access terminal to perform a method in accordance with any one of Aspects 21-29, wherein the transceiver is configured to receive the information identifying the parameters for wireless communications between the wireless station and the second wireless station.

Aspect 43: An access point (AP), comprising: a transceiver; a memory comprising instructions; and one or more processors configured to execute the instructions and cause the AP to perform a method in accordance with any one of Aspects 30-39, wherein the transceiver is configured to transmit the TXOP sharing trigger and the information identifying the parameters.

Aspect 44: An apparatus for wireless communications, comprising means for performing a method in accordance with any one of Aspects 1-39.

Aspect 45: A non-transitory computer-readable medium comprising instructions that, when executed by an apparatus, cause the apparatus to perform a method in accordance with any one of Aspects 1-39.

Additional Considerations

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
   a memory comprising instructions; and
   one or more processors configured to execute the instructions and cause the apparatus to:
      obtain, from an access point (AP), a transmission opportunity (TXOP) sharing trigger indicating a duration in which a TXOP is shared by the apparatus and one or more other devices;
      relay, to the one or more other devices, information identifying parameters for wireless communications between the apparatus and the one or more other devices; and
      during the TXOP, communicate with the one or more other devices based on the parameters wherein in order to communicate with the one or more other devices, the one or more processors are configured to communicate with the one or more other devices based on a bandwidth of a frame in which at least one of the TXOP sharing trigger or a clear to send message is carried.

2. The apparatus of claim 1, wherein the one or more other devices comprise one or more peer devices communicatively coupled to the apparatus.

3. The apparatus of claim 1, wherein the one or more other devices comprise a second AP.

4. The apparatus of claim 1, wherein the parameters for wireless communications between the apparatus and the one or more other devices comprises a puncturing pattern associated with subchannels.

5. The apparatus of claim 4, wherein the one or more processors are further configured to cause the apparatus to:
   signal, to the AP, an ability of the one or more other devices to support puncturing of one or more subchannels; and
   after the signaling, obtain a bitmap identifying one or more subchannels punctured by the AP, wherein the information identifying the puncturing pattern associated with subchannels comprises the obtained bitmap.

6. The apparatus of claim 1, wherein in order to relay the information identifying the parameters for wireless communications between the apparatus and the one or more other devices, the one or more processors are configured to output the information for transmission during a tunneled direct link setup (TDLS) procedure.

7. The apparatus of claim 6, wherein the information comprises information identifying one or more subchannels punctured by the AP.

8. The apparatus of claim 6, wherein the information comprises information identifying one or more subchannels punctured by the apparatus.

9. The apparatus of claim 1, wherein the one or more processors are further configured to cause the apparatus to puncture one or more subchannels for wireless communications between the apparatus and the one or more other devices during the TXOP.

10. The apparatus of claim 9, wherein the one or more processors are further configured to cause the apparatus to output for transmission to the AP information identifying the one or more subchannels punctured during the TXOP.

11. The apparatus of claim 1, wherein the information identifying the parameters for wireless communications between the apparatus and the one or more other devices is carried in a header of a frame transmitted to the one or more other devices.

12. The apparatus of claim 1, wherein the one or more processors are further configured to cause the apparatus to output for transmission to the AP an indication of a maximum bandwidth supported for wireless communications between the apparatus and the one or more other devices, wherein the bandwidth of the frame is based on the indicated maximum bandwidth.

13. The apparatus of claim 1, wherein the one or more processors are further configured to cause the apparatus to communicate with the AP during a first portion of the TXOP, wherein communicating with the one or more other devices comprises communicating with the one or more other devices during a second portion of the TXOP temporally after the first portion of the TXOP.

14. The apparatus of claim 13, wherein the second portion of the TXOP comprises a remainder of the TXOP after the first portion of the TXOP.

15. The apparatus of claim 1, wherein the one or more processors are further configured to cause the apparatus to obtain from the AP information identifying the parameters for wireless communications between the apparatus and the one or more other devices.

16. The apparatus of claim 1, wherein the parameters for wireless communications between the apparatus and the one or more devices comprise at least one of channel bandwidth for wireless communications between the apparatus and the one or more other devices, a maximum transmission power for wireless communications between the apparatus and the one or more other devices, a modulation and coding scheme (MCS) for wireless communications between the apparatus and the one or more other devices, a link identifier for wireless communications between the apparatus and the one or more other devices, spatial parameters for wireless communications between the apparatus and the one or more other devices, or timing information associated with a link between the apparatus and the one or more other devices.

17. The apparatus of claim 1, wherein the information identifying the parameters for wireless communications between the apparatus and the one or more other devices is relayed via a dedicated information element in a frame transmitted to the one or more other devices.

18. The apparatus of claim 1, wherein the information identifying the parameters for wireless communications between the apparatus and the one or more other devices is relayed via a quality of service (QoS) information element or a traffic specification (TSPEC) information element.

19. The apparatus of claim 1, wherein the information identifying the parameters for wireless communications between the apparatus and the one or more other devices is relayed via at least one of a stream classification service (SCS) request frame or a target wake time (TWT) request frame.

20. The apparatus of claim 1, further comprising a transceiver configured to receive the transmission opportunity (TXOP) sharing trigger, wherein the apparatus is configured as an access point or a wireless station.

21. An apparatus for wireless communications, comprising:
a memory comprising instructions; and
one or more processors configured to execute the instructions and cause the apparatus to:
establish a connection with a wireless node;
obtain from the wireless node information identifying parameters for wireless communications between the apparatus and the wireless node; and
communicate with the wireless node during a transmission opportunity (TXOP) based on the parameters, wherein in order to communicate with the wireless node during the TXOP, the one or more processors are configured to communicate with the wireless node based on subchannels punctured by an access point (AP) to which the wireless node is connected and subchannels punctured by the wireless node.

22. The apparatus of claim 21, wherein the parameters for wireless communications between the apparatus and the wireless node comprise a puncturing pattern associated with subchannels, and wherein the puncturing pattern is obtained via a bitmap in a management frame.

23. The apparatus of claim 21, wherein the parameters for wireless communications between the apparatus and the wireless node is obtained during a tunneled direct link setup (TDLS) procedure with the wireless node.

24. The apparatus of claim 21, wherein the one or more processors are further configured to cause the apparatus to dynamically puncturing one or more subchannels for wireless communications between the apparatus and the wireless node.

25. The apparatus of claim 21, wherein:
the TXOP is divided into a first portion and a second portion temporally after the first portion, and
in order to communicate with the wireless node, the one or more processors are configured to communicate with the wireless node during a second portion of a transmission opportunity (TXOP).

26. The apparatus of claim 21, wherein the information obtained from the wireless node comprises a puncturing pattern defined by the AP to which the wireless node is connected.

27. The apparatus of claim 21, wherein the information obtained from the wireless node comprises a puncturing pattern defined by the wireless node.

28. The apparatus of claim 21, wherein in order to communicate based on the subchannels punctured by the AP and subchannels punctured by the wireless node, the one or more processors are configured to communicate based on an intersection of the subchannels punctured by the AP and the subchannels punctured by the wireless node.

29. The apparatus of claim 21, further comprising a transceiver configured to receive the information identifying the parameters for wireless communications between the apparatus and the wireless node, wherein the apparatus is configured as a wireless station or a second access point.

30. An apparatus for wireless communications, comprising:
a memory comprising instructions; and
one or more processors configured to execute the instructions and cause the apparatus to:
output, for transmission to a wireless node, information identifying parameters for wireless communications between the wireless node and one or more other devices;
output, for transmission to the wireless node, a transmission opportunity (TXOP) sharing trigger indicating a duration in which the TXOP is to be shared by the wireless node and one or more other devices;

obtain, from the wireless node, information identifying one or more punctured subchannels for wireless communications between the wireless node and the one or more other devices that are punctured during the TXOP; and communicate with the wireless node during at least part of the TXOP based on the parameters and the identified one or more punctured subchannels.

31. The apparatus of claim 30, wherein the parameters for communications between the wireless node and the one or more other devices comprises a puncturing pattern associated with subchannels.

32. The apparatus of claim 31, wherein the one or more processors are further configured to cause the apparatus to obtain from the wireless node an ability of the one or more other devices to support puncturing of one or more subchannels, wherein the information identifying the puncturing pattern is based on the ability of the one or more other devices to support puncturing of the one or more subchannels.

33. The apparatus of claim 31, wherein the one or more processors are further configured to cause the apparatus to:
monitor one or more subchannels for transmissions on each of the one or more subchannels during the TXOP in which the wireless node and one or more other devices are communicating; and
identify the puncturing pattern based on monitoring the one or more subchannels.

34. The apparatus of claim 30, wherein the TXOP is divided into a first portion and a second portion, and in order to communicate with the wireless node based on the parameters for wireless communications between the wireless node and the one or more other devices, the one or more processors are configured to communicate with the wireless node during only the first portion of the TXOP.

35. The apparatus of claim 34, wherein the second portion of the TXOP comprises a remainder of the TXOP temporally after the first portion of the TXOP.

36. The apparatus of claim 30, wherein the one or more processors are further configured to cause the apparatus to output, for transmission to the wireless node, information identifying transmission parameters for wireless communications between the wireless node and the one or more other devices.

37. The apparatus of claim 30, wherein the parameters for wireless communications between the wireless node and the one or more devices comprise at least one of a channel bandwidth for wireless communications between the wireless node and the one or more other devices, a maximum transmission power for wireless communications between the wireless node and the one or more other devices, a modulation and coding scheme for wireless communications between the wireless node and the one or more other devices, a link identifier for wireless communications between the wireless node and the one or more other devices, spatial parameters for wireless communications between the wireless node and the one or more other devices, or timing information associated with a link between the wireless node and the one or more other devices.

38. The apparatus of claim 37, wherein the link identifier comprises a link identifier bitmap.

39. The apparatus of claim 30, further comprising a transceiver configured to transmit the information identifying the parameters and the TXOP sharing trigger, wherein the apparatus is configured as a wireless station or an access point.

40. An apparatus for wireless communications, comprising:
a memory comprising instructions; and
one or more processors configured to execute the instructions and cause the apparatus to:
obtain, from a wireless node, a transmission opportunity (TXOP) sharing trigger indicating a duration in which a TXOP is shared by the apparatus and one or more other devices;
relay, to the one or more other devices, information identifying parameters for wireless communications between the apparatus and the one or more other devices, wherein in order to relay the information, the one or more processors are configured to output the information during a tunneled direct link setup (TDLS) procedure; and
during the TXOP, communicate with the one or more other devices based on the parameters.

41. An apparatus for wireless communications, comprising:
a memory comprising instructions; and
one or more processors configured to execute the instructions and cause the apparatus to:
establish a connection with a wireless node;
obtain, from the wireless node, information identifying parameters for wireless communications between the apparatus and the wireless node, wherein the parameters for wireless communications between the apparatus and the wireless node is obtained during a tunneled direct link setup (TDLS) procedure with the wireless node; and
communicate with the wireless node during a transmission opportunity (TXOP) based on the parameters.

* * * * *